United States Patent [19]
Kuechler et al.

[11] Patent Number: 6,108,630
[45] Date of Patent: *Aug. 22, 2000

[54] TEXT-TO-SPEECH DRIVEN ANNUNCIATION OF CALLER IDENTIFICATION

[75] Inventors: Timothy Augustines Kuechler; Robert Barrie Turnbull; Nathan Lynn Peacock, all of Calgary, Canada

[73] Assignee: Nortel Networks Corporation, Montreal, Canada

[ * ] Notice: This patent issued on a continued prosecution application filed under 37 CFR 1.53(d), and is subject to the twenty year patent term provisions of 35 U.S.C. 154(a)(2).

[21] Appl. No.: 08/997,690

[22] Filed: Dec. 23, 1997

[51] Int. Cl.[7] .......................... G10L 13/00; H04M 11/00
[52] U.S. Cl. ................ 704/270; 704/258; 379/88.01; 379/88.21; 379/142; 455/415
[58] Field of Search .............................. 704/260, 270, 704/258; 379/88.01, 88.2, 77

[56] References Cited

U.S. PATENT DOCUMENTS

| | | | |
|---|---|---|---|
| Re. 31,789 | 1/1985 | Hashimoto | 179/5.5 |
| 3,727,003 | 4/1973 | Paraskevakos | 178/28 |
| 3,787,626 | 1/1974 | Subieta | 179/5.5 |
| 3,812,296 | 5/1974 | Paraskevakos | 179/18 B |
| 4,894,861 | 1/1990 | Fujioka | 379/374 |
| 4,922,490 | 5/1990 | Blakley | 370/110.1 |
| 4,924,496 | 5/1990 | Figa et al. | 379/142 |
| 5,007,076 | 4/1991 | Blakely | 379/67 |
| 5,220,599 | 6/1993 | Sasano et al. | 379/142 |
| 5,228,080 | 7/1993 | Nutter et al. | 379/373 |
| 5,263,084 | 11/1993 | Chaput et al. | 379/215 |
| 5,265,145 | 11/1993 | Lim | 379/88 |
| 5,283,818 | 2/1994 | Klausner et al. | 379/67 |
| 5,289,530 | 2/1994 | Reese | 379/88.01 |
| 5,309,512 | 5/1994 | Blackmon et al. | 379/210 |
| 5,349,638 | 9/1994 | Pitroda et al. | 379/142 |
| 5,467,385 | 11/1995 | Reuben et al. | 379/88 |

(List continued on next page.)

FOREIGN PATENT DOCUMENTS 195 43 040 A1 5/1997 Germany.

OTHER PUBLICATIONS

A. Magnavox Voice Announce Caller ID website http://www.frii.com/–maddog/callerid (as of Nov. 27, 1997).

B. Prophone (tm) Product Brochure for "selectPHONE" (tm); printed by Berkeley Speech Technologies, Inc., California, United States—Best Business Products of 1994.

C. Berkeley Speech Technologies—Product Brochure as early as 1995.

D. Talking Caller ID website http://www.talkingcallerid.com/ (as of Nov. 27, 1997).

E. CIDney the Talking Caller ID website http:// www.superproducts.com/index.htm (as of of Nov. 27, 1997).

F. Caller ID Voice Announce Caller ID System website http://ourworld.compuserve.com/homepages/peteness/callerid.htm (as of Nov. 27, 1997).

G. Caller ID 32 website http:.//www.interlog.com/–johnnie/CallerrID.html (as of Nov. 27, 1997).

H. Classco Inc. website http://www.classco.com/ as of Nov. 27, 1997.

*Primary Examiner*—David R. Hudspeth
*Assistant Examiner*—Susan Wieland
*Attorney, Agent, or Firm*—John D. Crane; Felsman, Bradley, Vaden, Gunter & Dillon, LLP

[57] ABSTRACT

A method and apparatus for producing an audio tag in response to calling line identification information. The method includes the steps of, receiving calling line identification information from a telephone line, searching a directory, using at least some of the calling line identification information as a search parameter to locate a directory record corresponding to at least some of the calling line identification information, communicating information held in the directory record or in the calling line identification information to a text to speech converter to produce the audio tag.

56 Claims, 5 Drawing Sheets

U.S. PATENT DOCUMENTS

| | | | |
|---|---|---|---|
| 5,481,595 | 1/1996 | Ohashi et al. | 379/67 |
| 5,526,406 | 6/1996 | Luncau | 379/61 |
| 5,646,979 | 7/1997 | Knuth | 455/563 |
| 5,661,788 | 8/1997 | Chin | 379/142 |
| 5,749,071 | 5/1998 | Silverman | 704/260 |
| 5,796,806 | 8/1998 | Birckbichler | 379/67 |
| 5,822,402 | 10/1998 | Marszalek | 379/67 |
| 5,822,727 | 10/1998 | Garberg et al. | 704/243 |
| 5,832,435 | 11/1998 | Silverman | 704/260 |
| 5,848,142 | 12/1998 | Yaker | 379/215 |
| 5,850,435 | 12/1998 | Devillier | 379/374 |
| 5,875,232 | 2/1999 | Wolf | 379/88 |
| 5,881,134 | 3/1999 | Foster et al. | 379/88 |
| 5,903,628 | 5/1999 | Brennan | 379/88.21 |
| 5,905,774 | 5/1999 | Tatchell et al. | 379/88.04 |
| 6,038,443 | 3/2000 | Luneau | 455/415 |

BEST NAME

TEXT-TO-SPEECH DRIVEN ANNUNCIATION OF CALLER IDENTIFICATION

FIELD OF THE INVENTION

This invention relates to annunciation devices for audibly annunciating the identity of a calling party at telephone equipment connected to a telephone switch.

BACKGROUND OF THE INVENTION

Most telephone operating companies have been offering calling line identification services in which the information of a calling party's telephone number and/or name is sent from a local central office to the called party's telephone station apparatus if a called party is a subscriber of that service. Early proposed versions of this service may be found in U.S. Pat. Nos. 3,727,003 and 3,812,296 to Paraskevakos, as well as in U.S. Pat. No. 3,787,626 to Subieta. A more recent scheme for providing this service is discussed in U.S. Pat. No. Re. 31,789 to Hashimoto.

In these patents, the directory number of a calling party is coded as FSK modulated pulse trains and is transmitted from the originating central office to the terminating office and sent to the called party's telephone station apparatus either before an alerting signal such as ringing is sent or during a silent interval between ringing signals. In these patents, the called party's station apparatus must be equipped with receiving circuitry for decoding the FSK modulated digital signal as well as a display device to indicate the identity of the calling party. The called party is then placed in the position of being given the opportunity to answer the call or ignore it. U.S. Pat. No. 5,263,084 to Chaput et al., discloses a method and a telephone station apparatus of displaying an identification of a third calling party.

Such visible identification of the calling party's telephone number or name is not advantageous for vision impaired people nor is visible identification convenient for identifying the calling party in the case where the called party is away from the telephone station apparatus which displays a calling party's telephone number in an onhook condition. Various schemes, therefore, have been proposed for providing audible annunciation of the calling party. One such scheme is disclosed in U.S. Pat. No. 4,922,490 to Blakely, however, this scheme involves interpretation of the calling party's identification at a central office switch and transmission of audio information directly to a telephone, the telephone being equipped with audio annunciation apparatus for producing an audio annunciation based on the audio signal provided by the central office. This renders the quality of the audio heard by the user dependent upon the audio production equipment at the central office. In addition, Magnovox has a website on the Internet at http://www.esn.net/callerid/TCmore.html which describes a voice announced caller identification unit. However, there is no indication that this device cooperates with text to speech converter or an external database to produce good quality audio. The present invention addresses this need.

The use of CLID information directly as it is provided by the telephone switch does not necessarily convert into a meaningful result when applied to a text to speech converter. For example, if the subscriber lists his name as T. A. Kuechler, the initials T. A. K may be treated as the word or syllable "tak". This may defeat the purpose of audibly announcing the caller's name as the name cannot be readily recognized as that of Mr. Kuechler. What would be desirable, therefore, is a device which would apply some intelligence to the information received as Caller Identification Information to provide an optimum audible announcement of the identity of the calling party.

SUMMARY OF THE INVENTION

In accordance with one aspect of the invention, there is provided a method of producing an audio tag in response to calling line identification information, The method includes the steps of, receiving calling line identification information from a telephone line, searching a directory, using at least some of the calling line identification information as a search parameter to locate a directory record corresponding to at least some of the calling line identification information, communicating information held in the directory record or in the calling line identification information to a text to speech converter to produce the audio tag.

Preferably, the method includes the step of playing the audio tag to identify the calling party.

Preferably, the method includes the step of searching a predefined computer readable telephone directory of names and numbers.

Preferably, the method includes the step of using a telephone number included in the calling line identification information as a search parameter to locate a name corresponding to the telephone number.

Preferably, the method includes the step of evaluating the calling line identification information and the information held in the directory record to determine which would sound best when applied to the text to speech converter.

Preferably, the method includes the step of determining the total number of characters in the calling line identification information and the information in the directory record.

Preferably, the method includes the step of determining the total number of vowels in the calling line identification information and the information in the directory record.

Preferably, the method includes the step of determining the number of vowels enclosed by consonants in the calling line identification information and the information in the directory record.

Preferably, the method includes the step of determining the total number of vowels in the calling line identification information and the information in the directory record.

Preferably, the method includes the step of determining the number of vowels enclosed by consonants in the calling line identification information and the information in the directory record.

Preferably, the method includes the step of determining which of the calling line identification information or the information in the directory record will sound best when applied to the text to speech converter by calculating respective audibility score values calculated as the weighted sum of the total number of characters, the total number of vowels and the number of vowels enclosed by consonants.

Preferably, the method includes the step of communicating to the text to speech converter, the calling line identification information or the information in the directory record according to which has the greatest number of characters, the greatest number of vowels and the greatest number of vowels enclosed by consonants.

In accordance with another aspect of the invention, there is provided a computer-readable storage medium on which is stored a plurality of computer-readable instructions for directing a processor to produce an audio tag in response to calling line identification information by receiving calling line identification information from a telephone line, searching a directory, using at least some of the calling line identification information as a search parameter to locate a directory record corresponding to at least some of the calling line identification information, communicating information held in the directory record or the calling line identification information to a text to speech converter to produce the audio tag.

In accordance with another aspect of the invention, there is provided an apparatus for producing an audio tag in response to calling line identification information. The apparatus includes a receiver for receiving calling line identification information from a telephone line, a processor for accessing and searching a directory, using at least some of the calling line identification information as a search parameter to locate a directory record corresponding to at least some of the calling line identification information, a text to speech converter for converting information held in the directory record or in the calling line identification information to produce the audio tag.

Preferably, the apparatus includes a digital to analog converter for converting the audio tag into an analog signal.

Preferably, the apparatus includes a speaker for converting the audio tag into an audible sound identifying the calling party.

Preferably, the digital to analog converter and speaker are controlled by the processor.

Preferably, the processor is programmed to search a predefined computer readable telephone directory of names and numbers.

Preferably, the processor is programmed to use a telephone number included in the calling line identification information as a search parameter to locate a name corresponding to the telephone number.

Preferably, the processor is programmed to evaluate the calling line identification information and the information held in the directory record to determine which would sound best when applied to the text to speech converter.

Preferably, the processor is programmed to determine the total number of characters in the calling line identification information and the information in the directory record.

Preferably, the processor is programmed to determine the total number of vowels in the calling line identification information and the information in the directory record. Preferably, the processor is programmed to determine the number of vowels enclosed by consonants in the calling line identification information and the information in the directory record.

Preferably, the processor is programmed to determine which of the calling line identification information and the information in the directory record will sound best when applied to the text to speech converter by calculating respective audibility score values calculated as the weighted sum of the total number of characters, the total number of vowels and the number of vowels enclosed by consonants.

Preferably, the processor is programmed to communicate to the text to speech converter, the calling line identification information or the information in the directory record according to which has the greatest number of characters, the greatest number of vowels and the greatest number of vowels enclosed by consonants.

Preferably, the text to speech converter includes instructions for directing the processor to produce an audio tag in response to text input.

Preferably, the text to speech converter is controlled by the processor.

Preferably, the directory includes instructions for directing the processor to access a memory medium containing the directory records.

Preferably, the memory medium is located remotely from the processor.

Preferably, the memory medium is controlled by the processor.

Preferably, the directory is controlled by the processor.

In accordance with another aspect of the invention, there is provided a method of audibly identifying a calling party. The method includes the steps of receiving calling line identification information from a telephone line, searching a directory, using at least some of the calling line identification information as a search parameter to locate a directory record corresponding to at least some of the calling line identification information, communicating information held in the directory record or in the calling line identification information to a text to speech converter to produce an audio tag and playing the audio tag to identify the calling party.

In accordance with another aspect of the invention, there is provided a computer-readable storage on which is stored a plurality of computer-readable instructions for directing a processor to audibly identify a calling party by executing the method steps listed immediately above.

In accordance with another aspect of the invention, there is provided an apparatus for audibly identifying a calling party. The apparatus includes a receiver for receiving calling line identification information from a telephone line, a processor for searching a directory, using at least some of the calling line identification information as a search parameter to locate a directory record corresponding to at least some of the calling line identification information, a text to speech converter for converting information held in the directory record or in the calling line identification information to produce the audio tag, and an audio tag converter for playing the audio tag to identify the calling party.

In accordance with another aspect of the invention, there is provided a method of annunciating the identity of a caller in response to calling line identification information. The method includes the step of receiving calling line identification information from a telephone line. A personal directory of personal directory records having name, number and audio tag fields is then searched to locate a record corresponding to the calling line identification information and on finding such record the contents of the audio tag field are annunciated. On not finding such a record corresponding to the calling line identification information a second directory, having records with name and number fields, is searched using at least some of the calling line identification information as a search parameter to locate a directory record corresponding to he at least some of the calling line identification information. Information held in the directory record or in the calling line identification information is then communicated to a text to speech converter to produce an audio tag and the audio tag is announced.

BRIEF DESCRIPTION OF THE DRAWINGS

In drawings which illustrate embodiments of the invention.

DETAILED DESCRIPTION

Figure 1:
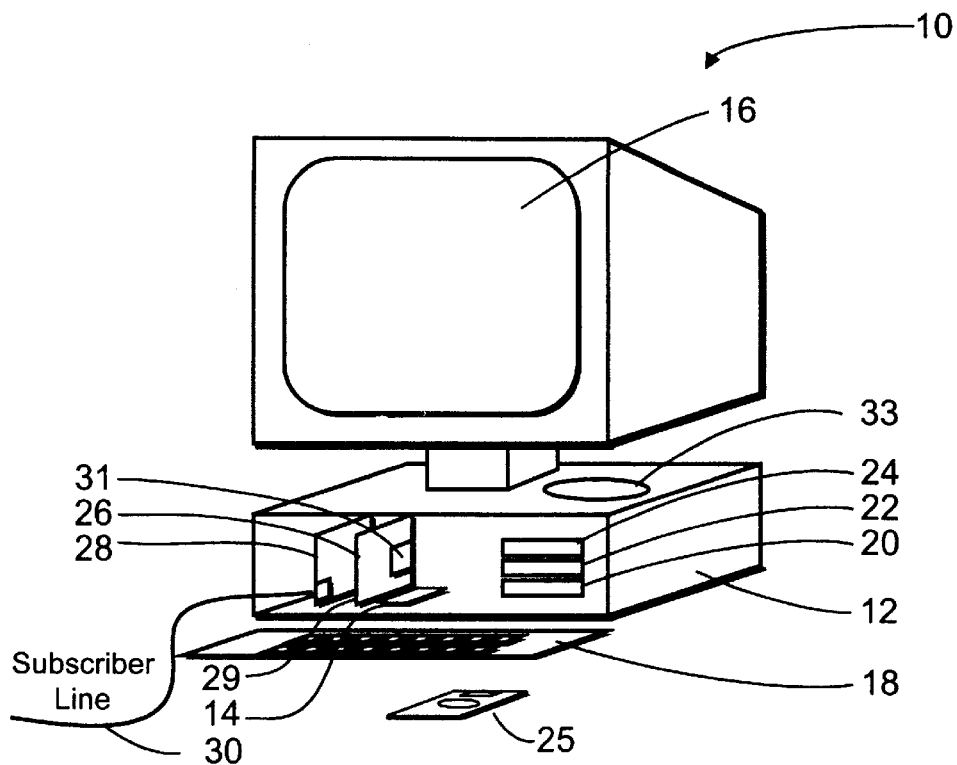
FIG. 1 is a perspective view of an apparatus according to a first embodiment of the invention.

Referring to FIG. 1, an apparatus for producing an audio tag in response to calling line identification information and for audibly identifying a calling party according to a first embodiment of the invention is shown generally at 10. In this embodiment, the apparatus includes a personal computer 12 having a processor 14 in communication with a display 16, a keyboard 18, a floppy disk drive 20, for receiving a floppy disk 25, a CD ROM drive 22 and a hard disk drive 24. In addition, further connected to the processor 14 is a modem card 26 having a subscriber line interface 28 for connection to a subscriber line 30 connected to a telephone company switch (not shown). The modem card 26 and subscriber line interface act as a receiver and receiving means for receiving calling line identification information from a telephone line.

The personal computer 12 also has a sound card 29 having a digital to analog converter 31 operable to provide signals to a speaker 33 on the personal computer 12.

FIG. 2

Figure 2:
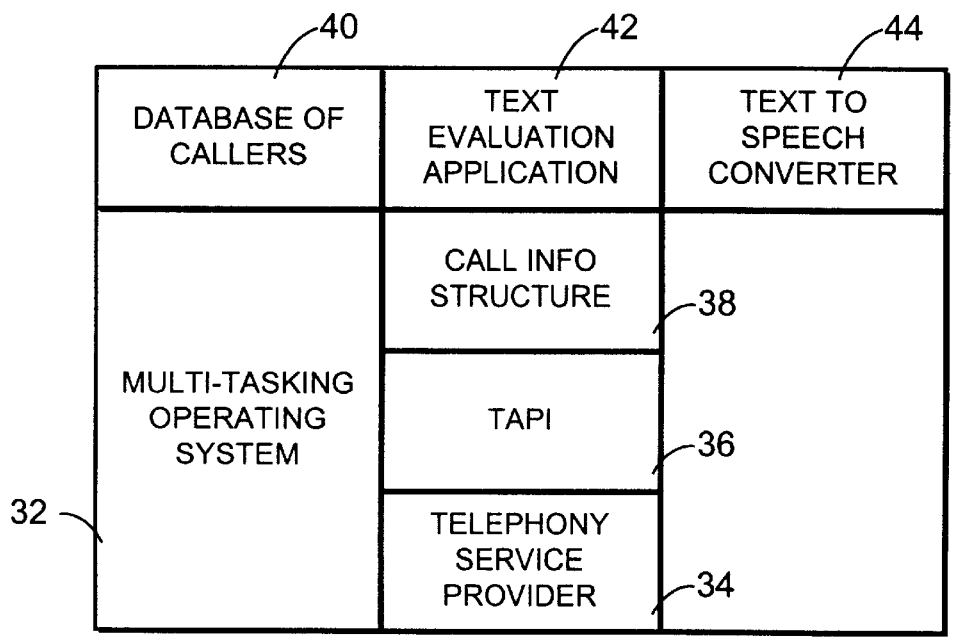
FIG. 2 is a schematic representation of programs running on a processor of the apparatus shown in FIG. 1.

Referring to FIG. 2, the personal computer 12 is controlled by a multitasking operating system 32, which in this embodiment, is Windows95 (tm) produced by Microsoft, Inc. The multitasking operating system has a telephony service provider module 34 which communicates with the modem card 26 shown in FIG. 1 to receive telephone caller identification information (CLID) from the subscriber line 30. Referring back to FIG. 2, the multitasking operating system further includes a Telephone Application Programmer's Interface (TAPI) 36 and a call information structure table 38, the call information structure table 38 being produced by the telephone application programmer's interface 36.

The multitasking operating system is resident on the hard disk drive 24 shown in FIG. 1. In addition, a database program 40 such as SelectPhone (tm) is installed on the hard disk drive 24 and a database of callers associated with the database program 40 is accessible through the CD ROM drive 22 which provides access to a memory medium, in particular a CD ROM provided by the database manufacturer. Thus, the memory medium is controlled by the processor.

FIG. 3

Figure 3:
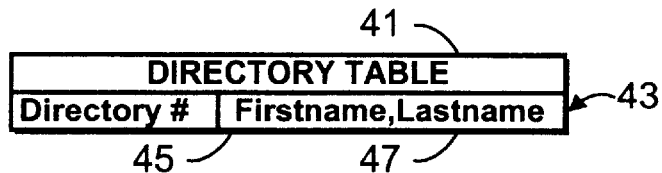
FIG. 3 is a tabular representation of a directory table in a database accessed according to the first embodiment of the invention.

Referring to FIG. 3, the CD ROM contains a plurality of directory tables 41 having directory records 43 with directory number fields 45 and directory first name, last name fields 47. Each record has a ten digit telephone number of a subscriber stored in the directory number field 45 and has a subscriber name stored in the directory first name, last name field 47. In this embodiment, the directory table includes records of all telephone subscribers in the United States. Thus, the directory is controlled by the processor.

Referring back to FIG. 2, the personal computer 12 further includes a text evaluation application program 42 and a text to speech converter program 44. The text to speech converter program is of the type provided by Berkeley Speech Systems of Berkeley, Calif. and essentially receives textual input and produces signals for controlling the sound card 29 to produce audible signals through the digital to analog converter 31, which are applied to the speaker 33.

FIG. 4

Figure 4:
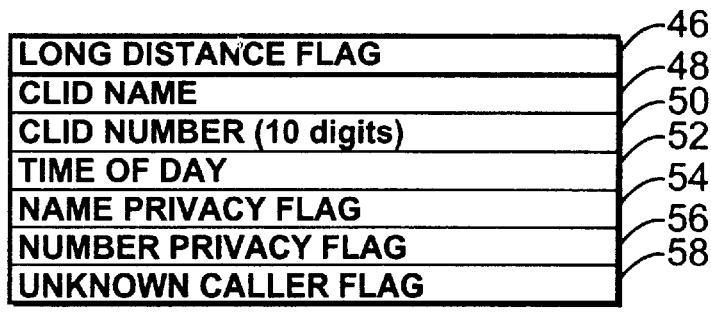
FIG. 4 is a tabular representation of a call information structure shown in FIG. 2.

Referring to FIG. 4, the call information structure table is shown generally at 38 and includes a long-distance flag field 46, a CLID name field 48, a CLID number field 50, a time of day field 52, a name privacy flag field 54, a number privacy flag field 56 and an unknown caller flag field 58. The above fields are for storing variables by the same names received from the calling line identification information received by the telephony service provider interface 34 from the modem card 26 and subscriber line 30. The TAPI 36 formats the calling line identification information received from the subscriber line into the format shown in FIG. 4.

Figure 8:
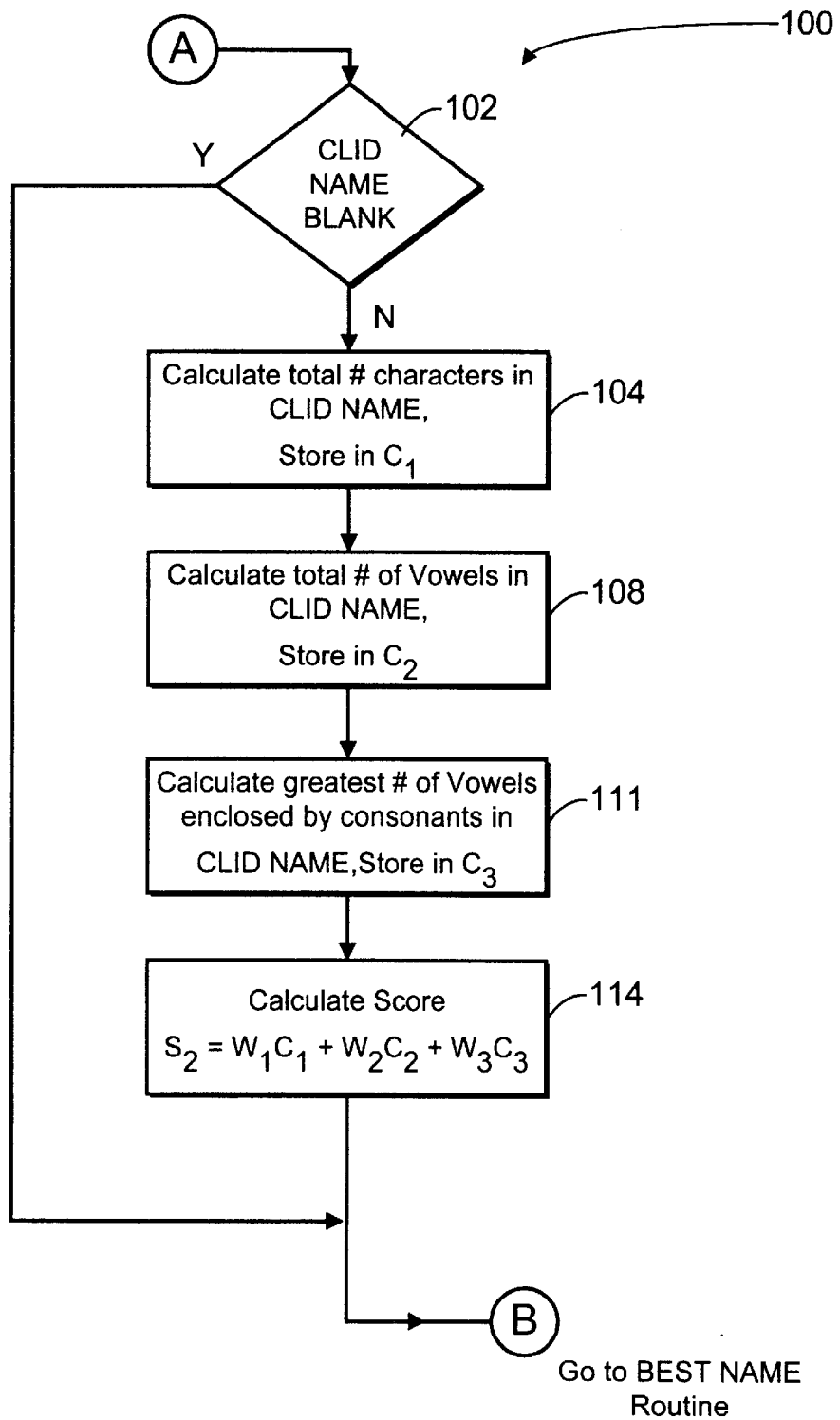
FIG. 8 is a flowchart of a caller identification name evaluation routine according to the first embodiment of the invention.
Figure 10:
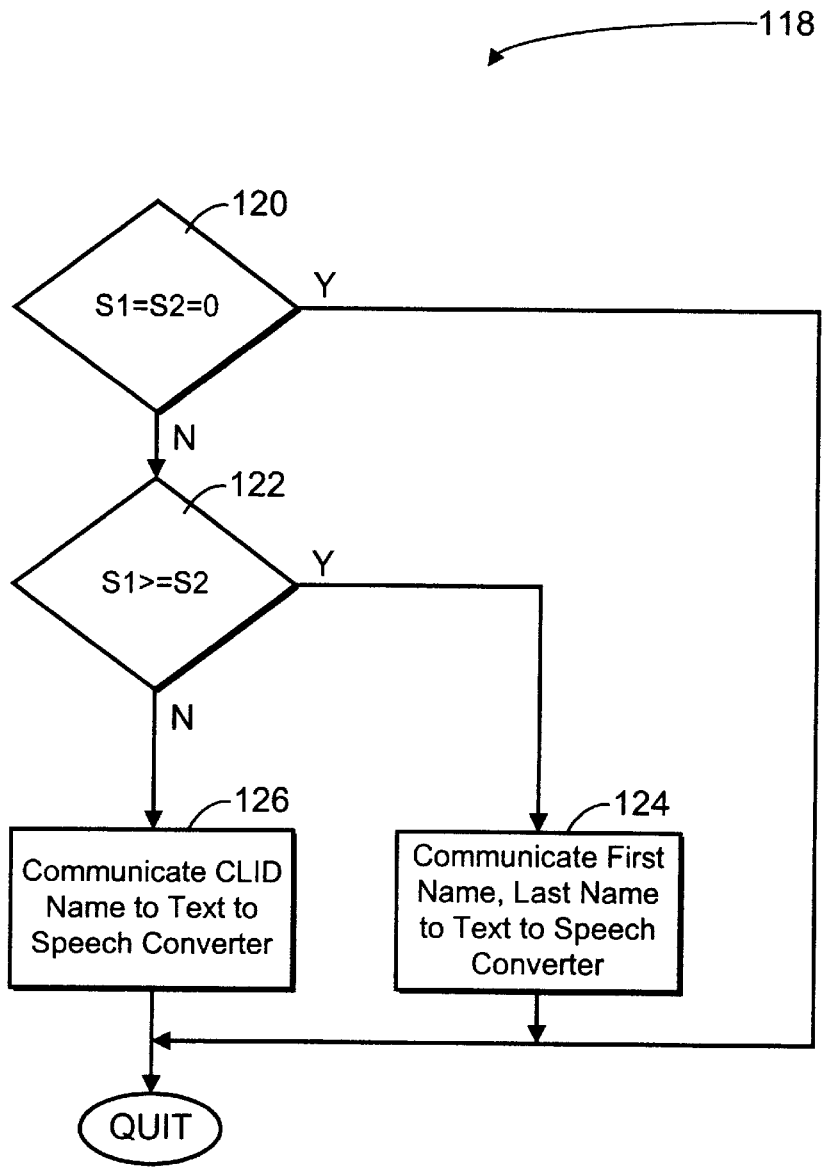
FIG. 10 is a flowchart of a best name routine according to the first embodiment of the invention.

Referring to FIGS. 1 and 2, the text evaluation application 42 includes computer-readable instruction codes stored on a floppy disk, which are transferred by the processor from the floppy disk 25 to the hard disk drive 24. These codes are operable to direct the processor 14 to execute a database access routine, a caller identification name evaluation routine and a best name routine as shown in FIGS. 5, 8 and 10 respectively.

Figure 6:
FIG. 6 is a tabular representation of a database query used by a text evaluation application shown in FIG. 2.
Figure 5:
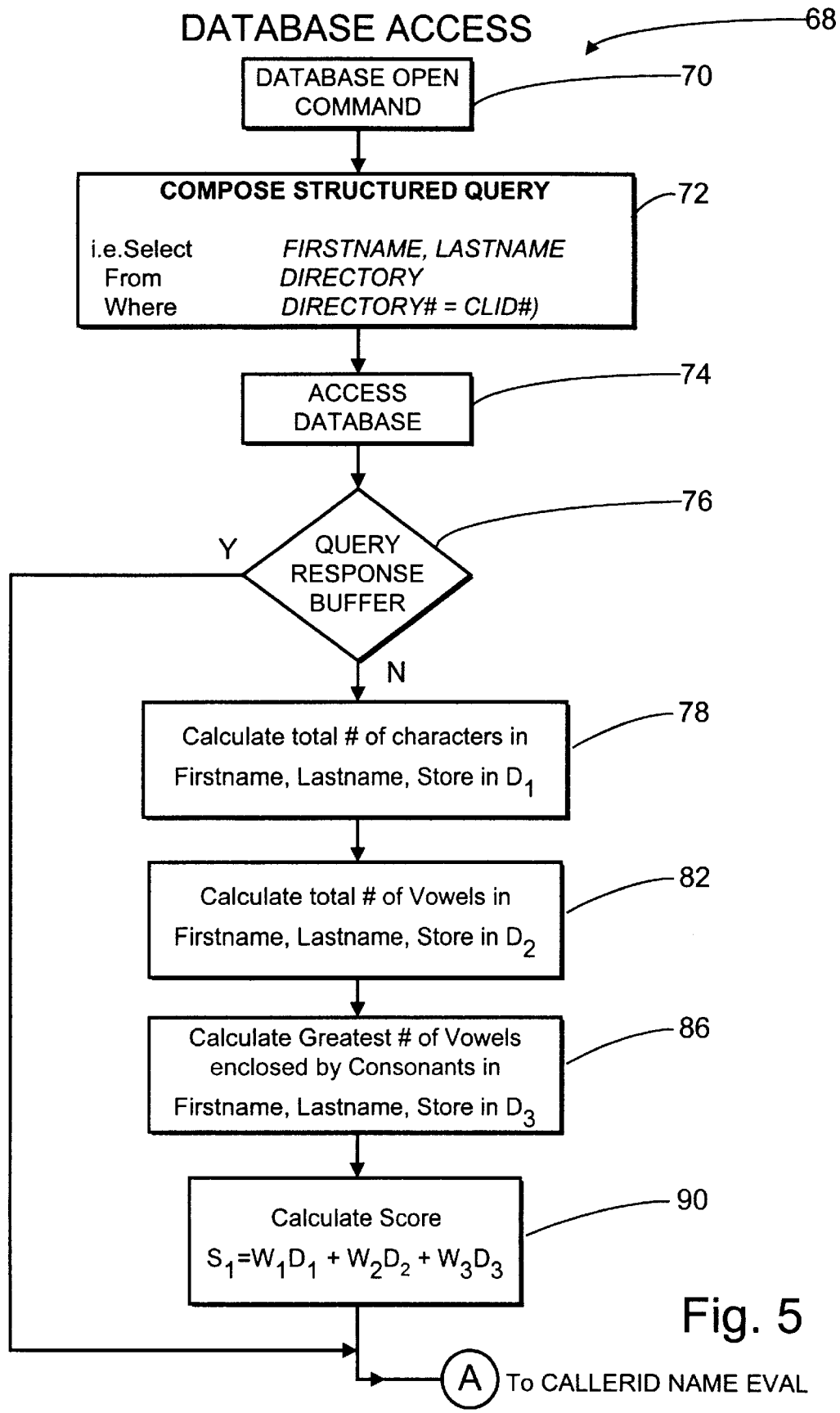
FIG. 5 is a flowchart of a database access routine according to the first embodiment of the invention.

Referring to FIG. 5, the text evaluation application begins with the database access routine 68 which begins with a first block 70 which directs the processor to execute a database open command on the SQL interface of the SelectPhone application. Referring to FIGS. 5 and 6, block 72 then directs the processor to compose a structured query in the form shown. The CLID number is copied into the query from the CLID number buffer 50. The processor then executes block 74 which directs it to access the database program 40 shown in FIG. 2 to make the query produced in block 72. Thus, the processor is programmed to act as means for searching a predefined computer readable telephone directory of names and numbers.

Figure 7:
FIG. 7 is a schematic representation of a query response produced by the database accessed according to the first embodiment of the invention.

Referring to FIGS. 3 and 7, on accessing the database, if a directory record 43 is found in the directory table 41, the record having directory number field 45 contents equal to the telephone number identified in the CLID number field 50 of the call information structure table shown in FIG. 4, the contents of the first name, last name field 47 are copied to a query response buffer 66 shown in FIG. 7. Thus, the processor acts as means for accessing and searching a directory, using at least some of the calling line identification information as a search parameter to locate a directory record corresponding to at least some of the calling line identification information. More particularly, the processor is programmed to act as means for using a telephone number included in the calling line identification information as a search parameter to locate a name corresponding to the telephone number.

Referring back to FIG. 5, block 76 then directs the processor 14 to determine whether or not the query response buffer 66 is empty or, in other words, whether or not it contains non-zero contents. If the query response buffer 66 is empty, ie., has zero contents, the processor is directed to the caller identification name evaluation routine shown in FIG. 8. Otherwise, block 78 directs the processor to calculate the total number of characters of the contents of the query response buffer 66 shown in FIG. 7 and to store the value so calculated in a $D_1$ register 80 shown in FIG. 9. Thus, the processor is programmed to act as determining means for determining the total number of vowels in the calling line identification information and the information held in the directory record.

Figure 9:
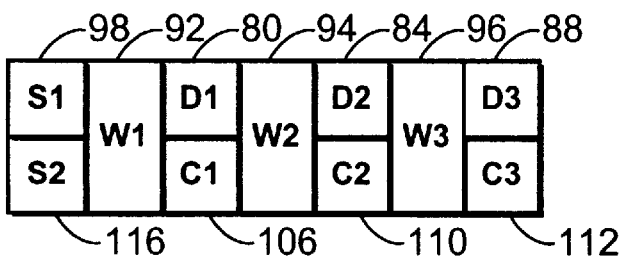
FIG. 9 is a schematic representation of registers used in evaluating information received from the subscriber line and information contained in a database record.

Referring back to FIG. 5, block 82 then directs the processor to calculate the total number of vowels in the name field 66 and store the number so calculated in a $D_2$ register 84 shown in FIG. 9. Thus, the processor is programmed to act as means for determining the total number of vowels in the calling line identification information and the information held in the directory record.

Referring back to FIG. 5, block 86 directs the processor to calculate the greatest number of vowels enclosed by consonants in the query response buffer 66 and to store the number so calculated in a $D_3$ register 88 shown in FIG. 9. Thus, the processor is programmed to act as means for determining the number of vowels enclosed by consonants in the calling line identification information and the information held in the directory record.

Referring back to FIG. 5, block 90 directs the processor to calculate an audibility score as the weighted sum of contents of the $D_1$, $D_2$ and $D_3$ registers 80, 84 and 88 shown in FIG. 9. In this regard, respective weights $W_1$ 92, $W_2$ 94 and $W_3$ 96 are applied to the contents of registers $D_1$ 80, $D_2$ 84 and $D_3$ 88 to produce the audibility score S1 according to the relation $S1=W_1D_1+W_2D_2+W_3D_3$, and the resulting score S1 is stored in register S1 98 shown in FIG. 9.

Referring back to FIG. 5, the database access routine is thus completed and the processor is directed to the caller identification name evaluation routine shown in FIG. 8. Referring to FIG. 8, the caller identification name evaluation routine is shown generally at 100 and begins with a first block 102 which directs the processor to determine whether or not the contents of the CLID name field 48 shown in FIG. 4 are blank. If so, the processor is directed to the best name routine shown in FIG. 10. Otherwise, block 104 directs the processor to calculate the total number of characters in the CLID name stored in the CLID name field 48 of FIG. 4 and store the result in a $C_1$ register 106 shown in FIG. 9. Thus, the processor is programmed to act as means for determining the total number of vowels in the calling line identification information and the information held in the directory record.

Referring back to FIG. 8, block 108 then directs the processor to calculate the total number of vowels in the contents of the CLID name field 48 shown in FIG. 4 and to store the number so calculated in a $C_2$ register 110 shown in FIG. 9.

Referring back to FIG. 8, block 111 then directs the processor to calculate the greatest number of vowels enclosed by consonants and to store the result so calculated in a $C_3$ register 112 shown in FIG. 9. Thus, the processor is programmed to act as means for determining the number of vowels enclosed by consonants in the calling line identification information and the information held in the directory record.

Referring back to FIG. 8, block 114 then directs the processor to calculate an audibility score $W_2$ for the CLID information, as a weighted sum of the contents of registers $C_1$ 106, $C_2$ 110 and $C_3$ 112, according to the relation $S2=W_1C_1+W_2C_2+W_3C_3$, where the contents of weighting registers $W_1$ 92, $W_2$ 94 and $W_3$ 96 shown in FIG. 9 are used as weighting factors. The audibility score $W_2$ is stored in the audibility score register S2 116.

Thus, the processor is programmed to act as means for determining which of the calling line identification information and the information held in the directory record will sound best when applied to the text to speech converter by calculating respective audibility score values calculated as the weighted sum of the total number of characters, the total number of vowels and the number of vowels enclosed by consonants.

Referring back to FIG. 6, the processor is then directed to the best name routine shown in FIG. 10.

FIG. 10

Referring to FIGS. 9 and 10, the best name routine is shown generally at 118 and begins with a first block 120 which directs the processor to determine whether or not the contents of the S1 and S2 registers 98 and 116 are equal to zero. If so, the best name routine is ended and no sound or audible indication of the caller's name is produced by the device.

If the contents of the S1 and S2 registers 98 and 116 are not equal to zero, block 122 directs the processor to determine whether or not the contents of the S1 register 98 are greater than or equal to the contents of the S2 register 116. If so, then block 124 directs the processor to communicate the contents of the query response buffer 66 to the text to speech converter program 44 in FIG. 2. The text to speech converter program then produces an audio tag in response to the contents of the query response buffer 66 and such audio tag is applied to the digital to analog converter 31 on the sound card 29 to cause the speaker 33 to audibly annunciate the contents of the query response buffer 66 shown in FIG. 3. Thus, the text to speech converter acts as a means for converting information held in the directory record or in the calling line identification information to produce an audio tag, the digital to analog converter acts as a means for converting the audio tag into an analog signal and the speaker acts as means for converting the audio tag into an audible sound identifying the calling party. It will be appreciated that the digital to analog converter and speaker are controlled by the processor. In effect, the digital to analog converter and speaker act as an audio tag converter or audio tag conversion means for playing the audio tag to identify the calling party.

Referring back to FIG. 10, if at block 122, the contents of the S1 register 98 are not greater than or equal to the contents of the S2 register 116, block 126 directs the processor to communicate the contents of the CLID name field 48 shown in FIG. 4 to the text to speech converter program 44 shown in FIG. 2. The text to speech converter program 44 then produces a digital signal representing an audio tag representing the contents of the CLID name field 48 shown in FIG. 4. The text to speech converter includes instructions for directing the processor to produce an audio tag in response to text input and the text to speech converter is controlled by the processor. The audio tag is then presented to the digital to analog converter 31 which produces an analog signal to drive the speaker 33 to cause the contents of the CLID name field 48 to be audibly annunciated. In effect, therefore, the processor is programmed to acts as a means for evaluating the calling line identification information and the information held in the directory record to determine which would sound best when applied to the text to speech converter. More particularly, the processor is programmed to communicate to the text to speech converter, the calling line identification information or the information held in the directory record according to which has the greatest number of characters, the greatest number of vowels and the greatest number of vowels enclosed by consonants.

Alternatives

Alternatively, the database program 40 may be replaced with a communications program which automatically accesses a remotely located database on a remotely located memory medium through a further communications line (not shown), which may include a further subscriber line which may include a network to which the personal computer 12 is connected. In this manner, a plurality of personal computers 12 may share the same database for locating directory records to determine the best representation for annunciation.

Alternatively, referring to FIG. 1, the processor is located inside an intelligent telephone rather than the personal computer 12. In such an embodiment, the text to speech converter may include a digital signal processor under the control of the processor 14 for producing audio tags in response to applied text as described above. Also, in such an embodiment, the directory which was described to have been stored on CD ROM in connection with the first embodiment, would be stored in memory within the intelligent telephone.

In a further embodiment of the invention, referring to FIG. 1, the user may maintain in the hard disk drive 24, a personal directory comprised of names, telephone numbers and voice tags which are prerecorded by the user. In addition, there may also be stored on the hard disk drive 24, a company phone list of extension numbers and names. The personal directory and company directory are used in addition to the directory table described above including the names and numbers of all telephone subscribers in the United States.

In this further embodiment, the database access routine is amended to include, preceding block 70, a query of the personal directory to locate a corresponding record containing a name of a caller and routines for calculating a score as described above associated with the name stored in the personal directory. In addition, the database access routine includes instructions for directing the processor to query the company phone list for a name and on finding such name, also calculating an audibility score. The modifications further include testing the score associated with the record found in the personal directory for a value greater than a preset threshold value and if such preset threshold value is exceeded, causing the contents of the name field of the personal directory to be applied to the text to speech converter. If, however, the name field in the personal directory has a score below the predefined value, the processor is directed to query the company phone list where the score associated with the name located in that list is compared against the threshold value and if above the threshold value the name associated with the company phone list is forwarded to the text to speech converter. If that name, however, has a score below the threshold value then the processor is directed to the database access routine 68 shown in FIG. 5 and processing continues as indicated with respect to the first embodiment of the invention.

It will be appreciated that in general, the apparatus receives calling line identification information and uses such information to look up in a directory a corresponding entry, which may have a name associated with the number provided by the calling line identification information. The apparatus then evaluates the calling line identification information and the name associated with the record located in the directory to determine which would sound best when presented to the text to speech converter. The expected best information is then applied to the text to speech converter to produce an audible indication of the party calling.

While specific embodiments of the invention have been described and illustrated, such embodiments should be considered illustrative of the invention only and not as limiting the invention as construed in accordance with the accompanying claims.

What is claimed is:

1. A method of producing an audio tag in response to calling line identification information, the method comprising:

a) receiving calling line identification information from a telephone line;

b) searching a directory, using at least some of said calling line identification information as a search parameter to locate a directory record corresponding to said at least some of said calling line identification information;

c) evaluating said calling line identification information and information held in said directory record to determine which has a greater audibility score; and d) communicating to a text to speech converter information held in said directory record or in said calling line identification information, whichever has the greater audibility score, to produce said audio tag.

2. A method as claimed in claim 1 further comprising playing said audio tag to identify said calling party.

3. A method as claimed in claim 1 wherein searching a directory further comprises the step of searching a predefined computer readable telephone directory of names and numbers.

4. A method as claimed in claim 3 wherein searching a directory further comprises the step of using a telephone number included in said calling line identification information as a search parameter to locate a name corresponding to said telephone number.

5. A method as claimed in claim 1 further comprising determining the total number of vowels in said calling line identification information and said information held in said directory record.

6. A method as claimed in claim 1 wherein evaluating further comprises the step of determining the number of vowels enclosed by consonants in said calling line identification information and said information held in said directory record.

7. A method as claimed in claim 1 further comprising determining the total number of characters in said calling line identification information and said information held in said directory record.

8. A method as claimed in claim 7 wherein evaluating further comprises the step of determining the total number of vowels in said calling line identification information and said information in held said directory record.

9. A method as claimed in claim 8 wherein evaluating further comprises the step of determining the number of vowels enclosed by consonants in said calling line identification information and said information held in said directory record.

10. A method as claimed in claim 9 further comprising calculating respective audibility score values for said calling line identification and said information held in said directory record, each of said audibility score values being calculated as the weighted sum of said total number of characters, said total number of vowels and said number of vowels enclosed by consonants.

11. A method as claimed in claim 9 further comprising communicating to said text to speech converter, said calling line identification information or said information in said directory record according to which has the greatest number of characters, the greatest number of vowels and the greatest number of vowels enclosed by consonants.

12. A computer-readable medium for providing a plurality of computer-readable instructions for directing a processor to produce an audio tag in response to calling line identification information by:
  a) searching a directory, using at least some calling line identification information received from a telephone line as a search parameter to locate a directory record corresponding to said at least some of said calling line identification information;
  b) evaluating said calling line identification information and information held in said directory record to determine which has a greater audibility score; and
  c) communicating to a text to speech converter information held in said directory record or said calling line identification information, whichever has the greater audibility score, to produce said audio tag.

13. A computer-readable medium as claimed in claim 12 further providing codes operable to direct the processor to determine the number of vowels enclosed by consonants in said calling line identification information and said information held in said directory record.

14. A computer-readable medium as claimed in claim 12 further providing codes operable to direct the processor to play said audio tag to identify said calling party.

15. A computer-readable medium as claimed in claim 12 further providing codes operable to direct the processor to search a predefined computer readable telephone directory of names and numbers.

16. A computer-readable medium as claimed in claim 15 further providing codes operable to direct the processor to use a telephone number included in said calling line identification information as a search parameter to locate a name corresponding to said telephone number.

17. A computer-readable medium as claimed in claim 12 further providing codes operable to direct the processor to determine the total number of vowels in said calling line identification information and said information held in said directory record.

18. A computer-readable medium as claimed in claim 12 further providing codes operable to direct the processor to determine the total number of characters in said calling line identification information and said information held in said directory record.

19. A computer-readable medium as claimed in claim 18 further providing codes operable to direct the processor to determine the total number of vowels in said calling line identification information and said information held in said directory record.

20. A computer-readable medium as claimed in claim 19 further providing codes operable to direct the processor to determine the number of vowels enclosed by consonants in said calling line identification information and said information held in said directory record.

21. A computer-readable medium as claimed in claim 20 further providing codes operable to direct the processor to calculate respective audibility score values for said calling line identification and said information held in said directory record, each of said audibility score values being calculated as the weighted sum of said total number of characters, said total number of vowels and said number of vowels enclosed by consonants.

22. A computer-readable medium as claimed in claim 20 further providing codes operable to direct the processor to communicate to said text to speech converter, said calling line identification information or said information held in said directory record according to which has the greatest number of characters, the greatest number of vowels and the greatest number of vowels enclosed by consonants.

23. An apparatus for producing an audio tag at a telephony device in response to calling line identification information, the apparatus comprising:
  a) a receiver for receiving calling line identification information from a telephone line;
  b) a processor for accessing and searching a directory, using at least some of said calling line identification information as a search parameter to locate a directory record corresponding to said at least some of said calling line identification information and for evaluating said calling line identification information and information held in said directory record to determine which has a greater audibility score; and
  c) a text to speech converter for converting information held in said directory record or in said calling line identification information, whichever has the greater audibility score, to produce said audio tag.

24. An apparatus as claimed in claim 23 further comprising a digital to analog converter for converting said audio tag into an analog signal.

25. An apparatus as claimed in claim 24 further comprising a speaker for converting said audio tag into an audible sound identifying said calling party.

26. An apparatus as claimed in claim 25 wherein said digital to analog converter and speaker are controlled by said processor.

27. An apparatus as claimed in claim 23 wherein said processor is programmed to search a predefined computer readable telephone directory of names and numbers.

28. An apparatus as claimed in claim 27 wherein said processor is programmed to use a telephone number included in said calling line identification information as a search parameter to locate a name corresponding to said telephone number.

29. An apparatus as claimed in claim 23 wherein said processor is programmed to determine the total number of characters in said calling line identification information and said information held in said directory record.

30. An apparatus as claimed in claim 29 wherein said processor is programmed to determine the total number of vowels in said calling line identification information and said information held in said directory record.

31. An apparatus as claimed in claim 30 wherein said processor is programmed to determine the number of vowels enclosed by consonants in said calling line identification information and said information held in said directory record.

32. An apparatus as claimed in claim 31 wherein said processor is programmed to calculate respective audibility score values for said calling line identification and said information held in said directory record, each of said audibility score values being calculated as the weighted sum of said total number of characters, said total number of vowels and said number of vowels enclosed by consonants.

33. An apparatus as claimed in claim 31 wherein said processor is programmed to communicate to said text to speech converter, said calling line identification information or said information held in said directory record according to which has the greatest number of characters, the greatest number of vowels and the greatest number of vowels enclosed by consonants.

34. An apparatus as claimed in claim 23 wherein said processor is programmed to determine the number of vowels enclosed by consonants in said calling line identification information and said information held in said directory record.

35. An apparatus as claimed in claim 23 wherein said processor is programmed to determine the total number of vowels in said calling line identification information and said information held in said directory record.

36. An apparatus as claimed in claim 23 wherein said text to speech converter further comprises instructions for directing said processor to produce an audio tag in response to text input.

37. An apparatus as claimed in claim 36 wherein said text to speech converter is controlled by said processor.

38. An apparatus as claimed in claim 23 wherein said directory further comprises instructions for directing said processor to access a memory medium containing said directory records.

39. An apparatus as claimed in claim 38 wherein said memory medium is located remotely from said processor.

40. An apparatus as claimed in claim 38 wherein said memory medium is controlled by said processor.

41. An apparatus as claimed in claim 40 wherein said directory is controlled by said processor.

42. A method of audibly identifying a calling party, the method comprising:
  a) receiving calling line identification information from a telephone line;
  b) searching a directory, using at least some of said calling line identification information as a search parameter to locate a directory record corresponding to said at least some of said calling line identification information;
  c) evaluating said calling line identification information and information held in said directory record to determine which has a greater audibility score;
  d) communicating to a text to speech converter information held in said directory record or in said calling line identification information, whichever has the greater audibility score, to produce an audio tag; and
  e) directing an audio tag converter to play said audio tag to identify said calling party.

43. A computer-readable medium for providing a plurality of computer-readable instructions for directing a processor to audibly identify a calling party by:
  a) receiving calling line identification information from a telephone line;
  b) searching a directory, using at least some of said calling line identification information as a search parameter to locate a directory record corresponding to said at least some of said calling line identification information;
  c) evaluating said calling line identification information and information held in said directory record to determine which has a greater audibility score;
  d) communicating to a text to speech converter information held in said directory record or in said calling line identification information, whichever has the greater audibility score, to produce an audio tag; and
  e) directing an audio tag converter to play said audio tag to identify said calling party.

44. An apparatus for audibly identifying a calling party, the apparatus comprising:
  a) a receiver for receiving calling line identification information from a telephone line;
  b) a processor for searching a directory, using at least some of said calling line identification information as a search parameter to locate a directory record corresponding to said at least some of said calling line identification information and for evaluating said calling line identification information and information held in said directory record to determine which has a greater audibility score;
  c) a text to speech converter for converting information held in said directory record or in said calling line identification information, whichever has the greater audibility score, to produce an audio tag; and
  d) an audio tag converter for playing said audio tag to identify said calling party.

45. An apparatus for audibly identifying a calling party, the apparatus comprising:
  a) receiving means for receiving calling line identification information from a telephone line;
  b) searching means for searching a directory, using at least some of said calling line identification information as a search parameter to locate a directory record corresponding to said at least some of said calling line identification information;
  c) means for evaluating said calling line identification information and information held in said directory record to determine which has a greater audibility score;
  d) text to speech conversion means for converting information held in said directory record or in said calling line identification information, whichever has the greater audibility score, to produce an audio tag; and
  e) audio tag conversion means for converting said audio tag into an audible sound to identify said calling party.

46. An apparatus for producing an audio tag in response to calling line identification information, the apparatus comprising:
  a) receiving means for receiving calling line identification information from a telephone line;
  b) searching means for searching a directory, using at least some of said calling line identification information as a search parameter to locate a directory record corresponding to said at least some of said calling line identification information;
  c) means for evaluating said calling line identification information and information held in said directory record to determine which has a greater audibility score; and
  d) text to speech conversion means for converting information held in said directory record or in said calling line identification information, whichever has the greater audibility score, to produce said audio tag.

47. An apparatus as claimed in claim 46 further comprising means for playing said audio tag to identify said calling party.

48. An apparatus as claimed in claim 46 wherein said searching means further comprises means for searching a predefined computer readable telephone directory of names and numbers.

49. An apparatus as claimed in claim 48 wherein said means for searching a directory further comprises means for using a telephone number included in said calling line identification information as a search parameter to locate a name corresponding to said telephone number.

50. An apparatus as claimed in claim 46 wherein said means for evaluating further comprises means for determining the total number of characters in said calling line identification information and said information held in said directory record.

51. An apparatus as claimed in claim 50 wherein said means for evaluating further comprises means for determining the total number of vowels in said calling line identification information and said information held in said directory record.

52. An apparatus as claimed in claim 51 wherein said means for evaluating further comprises means for determining the number of vowels enclosed by consonants in said calling line identification information and said information held in said directory record.

53. An apparatus as claimed in claim 52 further comprising means for calculating respective audibility score values for said calling line identification and said information held in said directory record, each of said audibility score values being calculated as the weighted sum of said total number of characters, said total number of vowels and said number of vowels enclosed by consonants.

54. An apparatus as claimed in claim 52 further comprising means for communicating to said text to speech conversion means, said calling line identification information or said information in said directory record according to which has the greatest number of characters, the greatest number of vowels and the greatest number of vowels enclosed by consonants.

55. An apparatus as claimed in claim 46 wherein said means for evaluating further comprises means for determining the total number of vowels in said calling line identification information and said information held in said directory record.

56. An apparatus as claimed in claim 46 wherein said means for evaluating further comprises means for determining the number of vowels enclosed by consonants in said calling line identification information and said information held in said directory record.

* * * * *

UNITED STATES PATENT AND TRADEMARK OFFICE
CERTIFICATE OF CORRECTION

PATENT NO. : 6,108,630
DATED : August 22, 2000
INVENTOR(S) : Kuechler et al.

It is certified that error appears in the above-identified patent and that said Letters Patent is hereby corrected as shown below:

On the first page under [75] Inventors: please delete "Augustines" and replace with --Augustus--.

At column 10, line 35, please delete "wherein evaluating".

Signed and Sealed this

First Day of May, 2001

Attest:

NICHOLAS P. GODICI

*Attesting Officer*  *Acting Director of the United States Patent and Trademark Office*